US006194044B1

(12) United States Patent
Stahl

(10) Patent No.: US 6,194,044 B1
(45) **Date of Patent: *Feb. 27, 2001**

(54) EMBLEM FOR EMBROIDERY STITCHING TO A SUBSTRATE AND METHOD

(75) Inventor: Ted A. Stahl, Harrison Township, MI (US)

(73) Assignee: Stahls' Inc., St. Clair Shores, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/595,791

(22) Filed: Feb. 2, 1996

(51) Int. Cl.[7] ........................................ B32B 7/12

(52) U.S. Cl. ..................... 428/40.1; 112/439; 428/41.9; 428/42.1; 428/200; 428/214; 428/906.6

(58) Field of Search ............................ 428/40.1, 41.7, 428/41.8, 41.9, 42.1, 200, 214, 343, 346, 347, 354, 355, 906.6; 112/439; 206/45.3

(56) References Cited

U.S. PATENT DOCUMENTS

| | | | | |
|---|---|---|---|---|
| 3,660,212 | | 5/1972 | Liebe | 161/41 |
| 3,785,014 | * | 1/1974 | Canepa | 428/40.1 |
| 3,816,211 | * | 6/1974 | Haigh | 428/906.6 |
| 3,922,435 | | 11/1975 | Asnes | 428/439 |
| 4,035,532 | | 7/1977 | Gregorian et al. | 428/90 |
| 4,292,100 | | 9/1981 | Higashiguchi | 156/72 |
| 4,314,813 | | 2/1982 | Masaki | 8/468 |
| 4,340,632 | | 7/1982 | Wells et al. | 428/90 |
| 4,423,106 | | 12/1983 | Mahn | 428/207 |
| 4,640,727 | | 2/1987 | Janssen | 156/240 |
| 4,652,478 | | 3/1987 | Maii | 428/43 |
| 4,717,621 | * | 1/1988 | So | 428/349 |
| 4,731,149 | | 3/1988 | Dowzall et al. | 156/541 |
| 4,735,854 | | 4/1988 | Lauchenauer | 428/347 |
| 4,786,349 | | 11/1988 | Mahn | 156/234 |
| 4,810,549 | | 3/1989 | Abrams et al. | 428/88 |
| 4,869,957 | | 9/1989 | Vankerckhoven et al. | 428/352 |
| 4,902,364 | | 2/1990 | Parker et al. | 156/233 |
| 4,927,682 | | 5/1990 | Nagura et al. | 428/88 |
| 5,021,275 | | 6/1991 | Kim | 428/42 |
| 5,026,584 | | 6/1991 | Logan | 428/41 |
| 5,047,103 | | 9/1991 | Abrams | 156/72 |
| 5,073,423 | | 12/1991 | Johnson et al. | 428/40 |
| 5,098,772 | | 3/1992 | ef Strom | 428/211 |
| 5,112,423 | | 5/1992 | Liebe | 156/234 |
| 5,143,672 | | 9/1992 | Kuwahara | 264/132 |
| 5,149,388 | * | 9/1992 | Stahl | 428/906.6 |
| 5,167,750 | | 12/1992 | Myers | 156/583.9 |
| 5,196,080 | | 3/1993 | Mizobuchi et al. | 156/234 |
| 5,200,268 | | 4/1993 | Hamada | 428/354 |
| 5,207,851 | | 5/1993 | Abrams | 156/230 |
| 5,310,589 | | 5/1994 | Nagashima | 428/40 |
| 5,312,673 | | 5/1994 | Dressler | 428/195 |
| 5,338,603 | | 8/1994 | Mahn, Sr. et al. | 428/349 |
| 5,635,001 | * | 6/1997 | Mahn | 428/102 |

OTHER PUBLICATIONS

"Pressure–Sensitive Tapes and Labels", C.W. Bemmels, Adherends and Bonding Technology pp. 724–735.

* cited by examiner

*Primary Examiner*—Nasser Ahmad
(74) *Attorney, Agent, or Firm*—Brooks & Kushman P.C.

(57) ABSTRACT

An emblem for embroidery stitching directly to a substrate is disclosed which provides an emblem which can be readily embroidered. The emblem includes a fabric layer with a thermoplastic adhesive coating one side of the fabric layer and a pressure sensitive adhesive coating the thermoplastic adhesive to provide an emblem which can temporarily adhere to a substrate. The emblem can thus be temporarily secured during embroidery and prevent distortion of the emblem. Following embroidery, the emblem is heat-sealed to a substrate and the thermoplastic adhesive coating penetrates through the pressure sensitive adhesive for attachment of the emblem to the substrate.

5 Claims, 2 Drawing Sheets

EMBLEM FOR EMBROIDERY STITCHING TO A SUBSTRATE AND METHOD

FIELD OF INVENTION

This present invention relates to an emblem which is designed to facilitate embroidery of the emblem to a substrate with the use of an emblem having a pressure sensitive adhesive layer for temporary registry of the emblem on the substrate during embroidery. The invention also relates to a method for embroidery stitching an emblem to a substrate.

BACKGROUND ART

Emblems such as letters and numbers having embroidered edges have become widely used in many areas. Emblems have in particular found great use in the garment industry, specifically for sports uniforms, jerseys and the like. In sports, such embroidered emblems are used to identify player and team numbers, names and logos of sponsors. Embroidered emblems have also found use in conjunction with souvenir apparel or simply for decorative purposes.

In some instances, the emblem is held in place for embroidery using pins. In other cases, a hoop is placed around the emblems to secure the emblem in desired location for embroidery. One problem associated with these embroidery securement methods is that during embroidery, the emblem may distort or shift causing the embroidery to be misapplied or imprecisely placed. Moreover, such embroidery techniques are cumbersome and overly time consuming. Accordingly, there exists a need for a simplified method for emblem embroidery on a substrate. There is also a need for a method which facilitates the precise application of the embroidery of an emblem to a substrate.

DISCLOSURE OF INVENTION

An object of the present invention is to provide an emblem which can be readily embroidered to a substrate without distortion of the emblem during the embroidery.

Another object of the invention is to provide a method for embroidery and heat-sealing an emblem to a substrate, wherein the method is simple and efficient.

An additional object of the invention is to provide an emblem which is designed to facilitate precise embroidery of an emblem to a substrate.

In carrying out the above objects of the invention, a method of embroidering and heat-sealing an emblem to a substrate, comprises the steps of providing a fabric layer; coating one face of the fabric layer with a thermoplastic adhesive; coating the thermoplastic adhesive with a pressure sensitive adhesive that allows the thermoplastic adhesive to penetrate through the pressure sensitive adhesive coating upon the application of heat; covering the pressure sensitive adhesive coating with a releasable protective carrier sheet; cutting at least through the fabric and adhesive coatings in the configuration of a desired emblem; removing the emblem from the carrier sheet; positioning the emblem on the substrate in a desired location, such that the pressure sensitive adhesive coating is in contact with the substrate; pressing the emblem against the substrate to temporarily register the pressure sensitive adhesive coating to the substrate; embroidering the emblem to the substrate without distortion of the emblem; and applying heat towards the substrate so that the thermoplastic adhesive coating penetrates through the pressure sensitive adhesive coating to affix the emblem to the substrate.

The emblem's pressure sensitive adhesive coating allows the emblem to temporarily register on the underlying substrate, thereby eliminating any problems with gathering or distortion of the emblem during the embroidery process. Furthermore, as a result of the pressure sensitive adhesive coating, the emblem can be temporarily registered to prevent shifts of the emblem during embroidery, ensuring accurate embroider stitching of the emblem to the substrate.

The present invention further discloses a laminate for heat-sealing emblems to a substrate, comprising a fabric layer coated on one side with a thermoplastic adhesive; a pressure sensitive adhesive coating the thermoplastic adhesive coating to provide temporary registry of the emblem to a desired substrate and facilitate embroidery without emblem distortion; the thermoplastic adhesive coating is capable of penetrating through the pressure sensitive adhesive coating upon the application of heat to affix the emblem to the substrate; and a carrier sheet overlying the pressure sensitive adhesive coating to provide a releasable covering for the pressure sensitive adhesive coating and prevent any significant reduction in tackiness.

The present invention further provides an emblem design to facilitate embroidery and heat sealing of an emblem to a substrate, comprising a fabric layer cut to the configuration of a desired emblem; a thermoplastic adhesive coating one face of the fabric layer; a pressure sensitive adhesive coating the thermoplastic adhesive which upon the application of pressure thereon allows temporary registry of the emblem to the substrate and facilitates embroidery without emblem distortion; and the pressure sensitive adhesive allows the thermoplastic adhesive to penetrate therethrough upon the application of heat.

The above objects, features and advantages of the present invention are readily apparent from the detailed description of the best mode for carrying out the invention when taken in connection with the accompanying drawings.

BEST MODE FOR CARRYING OUT THE INVENTION

Figure 1:
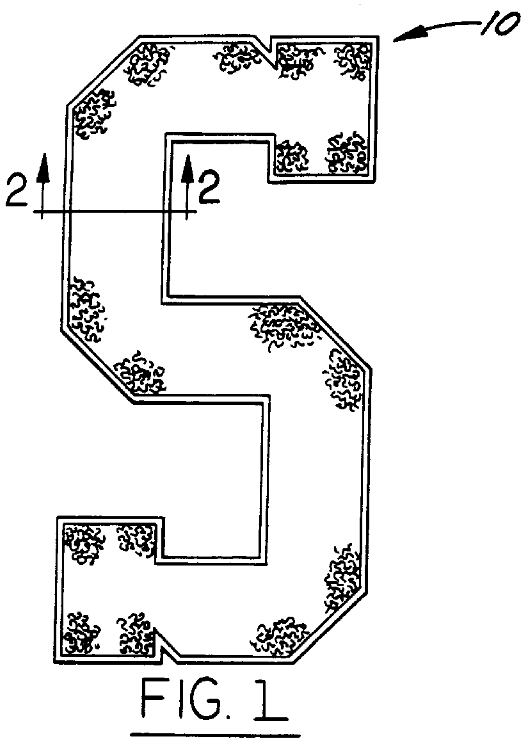
FIG. 1 is a perspective view of an emblem produced according to the present invention.

Referring to FIG. 1 of the drawings, there is shown an emblem produced in accordance with the present invention, consisting of the letter "S" and generally indicated by reference "10". As is hereinafter more fully described, the emblem 10 eliminates the difficulty associated with embroidering an emblem on a substrate. Use of this emblem facilitates embroidering an emblem directly on a substrate.

Figure 2:
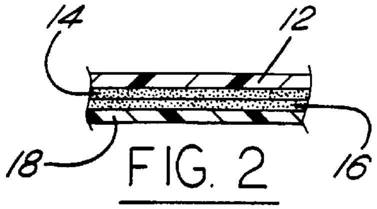
FIG. 2 is a side view taken along lines 2—2, showing the layering structure of the emblem.

As shown in FIG. 2, the emblem 10 depicted in FIG. 1 includes a fabric layer 12, cut to the configuration of a desired emblem; a thermoplastic adhesive 14 coating one face of the fabric layer 12; a pressure-sensitive adhesive 16 coating the thermoplastic adhesive 14 and a carrier sheet 18 overlying the pressure sensitive adhesive coating 16 to provide a releasable covering for the pressure sensitive adhesive coating 16 and preventing any significant reduction in tackiness.

The fabric layer 12 of the emblem 10 is preferably a woven material such as twill, cotton, polyester or felt.

The thermoplastic adhesive coating 14 is preferably one of the following: polyurethane, polyamide, polyester, polyethylene, polyvinyl acetate, polyolefin, polyvinyl chloride, ethylene-vinylacetate copolymer, polypropylene and blends thereof.

The pressure sensitive adhesive coating 16 is preferably an acrylic ester, polymer or copolymer, silicone resin, polyurethane dispersions, EVA and rubber-solvent blends. The pressure sensitive adhesive coating 16 is also applied to the thickness which allows the thermoplastic adhesive coating 14 to penetrate the pressure sensitive adhesive coating 16 upon the application of heat.

The carrier sheet 18, overlying the pressure sensitive adhesive coating 16, is optionally used as a releasable covering to protect the pressure sensitive adhesive coating 16 prior to attachment of the emblem to the substrate. The use of such a carrier sheet 18, prevents the pressure sensitive adhesive coating 16 from picking up stray dust or debris, which would subsequently reduce the tackiness of the pressure sensitive adhesive coating 16.

The emblem 10 is thus designed to facilitate embroidery and heat-sealing of an emblem to a substrate. Specifically, the pressure sensitive adhesive coating 16 is designed so that upon the application of pressure, the pressure sensitive adhesive coating 16 temporarily registers the emblem 10 to a desired substrate. The ability to temporarily register the emblem to a substrate provides a technique for securing the emblem 10 to a substrate during embroidery, without the need for pins or hoops or other securement methods.

One significant benefit associated with such a pressure sensitive adhesive coating 16 is that the emblem 10 is not distorted during embroidery. Additionally, the emblem 10 cannot randomly shift during embroidery and cause the embroidery to be imprecisely applied. Moreover, the pressure sensitive adhesive coating 16 is designed to allow the thermoplastic adhesive coating 14 to penetrate through the pressure sensitive adhesive coating 16 when heat is applied to the emblem. Such a design allows for a temporary registry of the emblem during embroidery, in addition to adhesive attachment of the emblem 10 to an underlying substrate.

Figure 3:
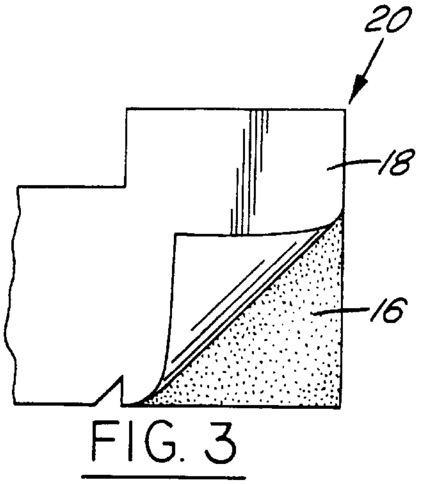
FIG. 3 is a perspective view of a laminate produced according to the present invention.

FIG. 3 depicts a laminate 20 for heat-sealing emblems to a substrate. As shown in FIG. 3, the laminate 20, includes a carrier sheet 18 overlying a pressure sensitive adhesive coating 16 to provide a releasable covering for the pressure sensitive adhesive coating 16. Although not illustrated in FIG. 3, the laminate 20 is made up of a fabric layer 12 coated on one side with a thermoplastic adhesive coating 14; a pressure sensitive adhesive 16 coating the thermoplastic adhesive coating 12 to provide temporary registry of the pressure sensitive adhesive coating to a desired substrate; and a carrier sheet 18 which overlies the pressure sensitive adhesive coating to provide a releasable covering.

The laminate 20 allows multiple emblems to be cut therefrom. Such a laminate 20 assists in the mass production of the emblem 10, as shown in FIG. 1.

Figure 4:
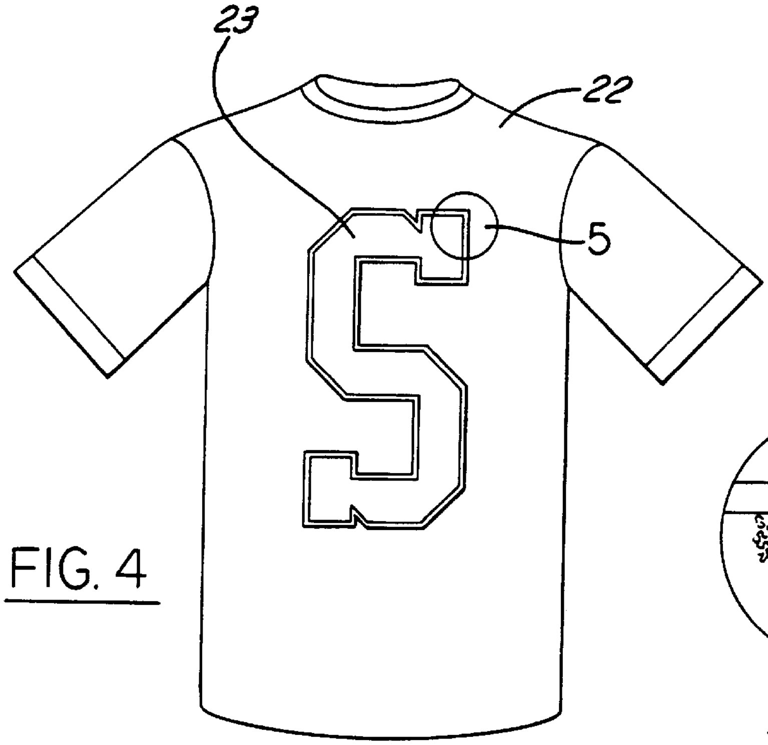
FIG. 4 is a perspective view of an emblem on a fabric substrate.

As shown in FIG. 4, the emblem 10 of FIG. 1 is positioned to a substrate 22 such as the illustrated garment. The emblem 10 can be used in conjunction with a variety of different fabric substrates. Accordingly, fabric substrates of various shapes are suitable. The fabric substrate 22, however, must be at least large enough to allow the emblem 10 to be embroidered thereon.

Figure 5:
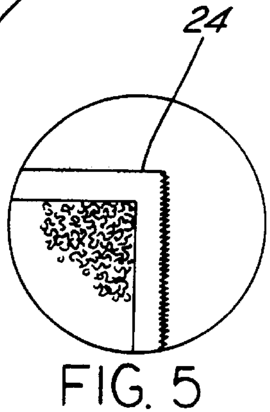
FIG. 5 is an exploded view of the encircled portion of FIG. 4, depicting the embroidery stitching the emblem to the fabric substrate.

As shown in FIG. 5, the present invention results in the embroider stitching 24 of an emblem to a substrate 22.

Figure 6:
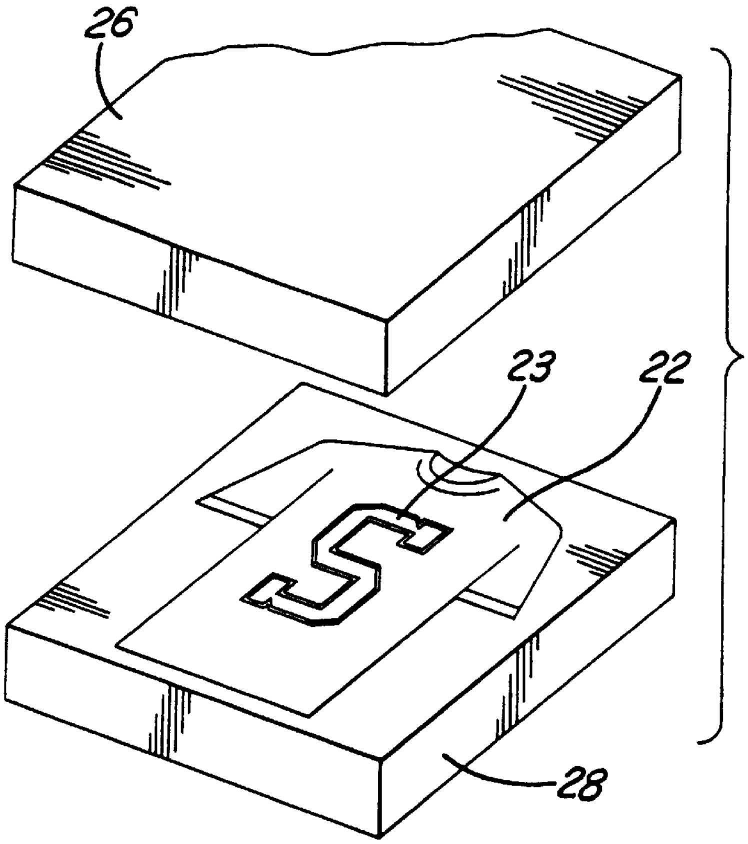
FIG. 6 is a perspective view of a heat-sealing apparatus, wherein the emblem is embroidered onto the substrate and an upper and lower platen apply heat to the embroidered emblem to affix the emblem onto the fabric substrate.
Figure 7:
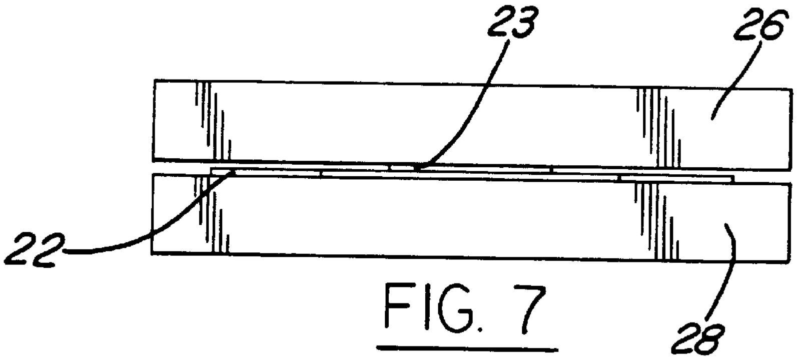
FIG. 7 is a side view of a heat-sealing process, as shown in FIG. 6.

FIG. 6 depicts the conventional heat-sealing apparatus used to apply heat onto the embroidered emblem 23 to affix the emblem 23 onto the substrate 22. As depicted in FIG. 6, the upper platen 26 and the lower platen 28 are used to apply heat and pressure onto the emblem 10. Both the upper platen 26 and the lower platen 28 may be heated, so that when the two platens are placed in operative position, as shown in FIG. 7, the platens drive the emblem 10 towards the substrate 22 and apply heat to the emblem 10, specifically causing the thermoplastic adhesive coating 14 to melt and penetrate through the pressure sensitive adhesive coating 16. Thus, the application of heat by the upper and lower platens 26, 28 causes the thermoplastic adhesive 14 to affix the emblem 10 to the desired substrate 22.

The thermoplastic adhesive coating 14 preferably melts in the range of between 280° and 350° F. The temperature of the upper and lower plates 26, 28 are selected to ensure that the thermoplastic adhesive layer 14 penetrates through the pressure sensitive adhesive coating 16 and affixes itself onto the substrate 22.

The carrier sheet is preferably made of a material that can be releasably attached to a pressure sensitive adhesive coating 16. The carrier sheet 18 can be made from paper, fabric, plastic or Teflon™. The carrier sheet 18 is preferably paper. The use of the carrier sheet 18 allows the emblem 10 to be supported and stored for ease of handling and use.

While the best mode for carrying out the invention has been described in detail, those familiar with the art to which this invention relates will recognize various alternative designs and embodiments for practicing the invention as defined by the following claims.

What is claimed is:

1. An emblem designed to facilitate embroidery and heat-sealing of an emblem to a substrate, comprising:

a fabric layer cut to the configuration of a desired emblem;

a thermoplastic adhesive coating completely covering one face of said fabric layer said thermoplastic adhesive having a melting temperature between 280° F. and 350° F.;

an outer adhesive coating completely covering said thermoplastic adhesive, said outer adhesive being a pressure and heat sensitive adhesive which upon the application of pressure thereon allows temporary registry of said emblem to the substrate and facilitates embroidery without emblem distortion; and said outer adhesive allows said thermoplastic adhesive to penetrate therethrough upon the application of heat to affix said emblem to the substrate.

2. The emblem assembly of claim 1 further including a carrier sheet overlying said outer adhesive coating to provide a releasable coating for said outer adhesive coating and prevent reduction and tackiness of said outer coating completely covering.

3. A laminate for heat-sealing emblems onto a substrate, comprising:

a fabric layer laminated on one side with a thermoplastic adhesive coating, completely covering said one side, said thermoplastic adhesive having a melting temperature between 280° F. and 350° F.;

an outer adhesive coating said thermoplastic adhesive, said outer adhesive being a pressure and heat sensitive adhesive selected from the group consisting of acrylic esters, acrylic polymers, acrylic copolymers, silicone, resin, polyurethane dispersions, ethylene-vinylacetate copolymer, and rubber solvent blends which upon the application of pressure thereon allows temporary registry of said emblem to the substrate and facilitates embroidery without emblem distortion; and said outer adhesive allows said thermoplastic adhesive to penetrate therethrough upon the application of heat to affix said emblem to said substrate.

4. The emblem assembly of claim 1, wherein said fabric layer is a woven material selected from the group consisting of twill, cotton, polyester and felt.

5. The emblem assembly of claim 1, wherein said thermoplastic adhesive coating is selected from the group consisting of polyurethane, polyamide, polyester, polyethylene, polyvinyl acetate, polyolefin, polyvinyl chloride, ethylene-vinylacetate copolymer, polypropylene and blends thereof.

* * * * *

UNITED STATES PATENT AND TRADEMARK OFFICE

CERTIFICATE OF CORRECTION

PATENT NO. : 6,194,044 B1
DATED : February 27, 2001
INVENTOR(S) : Ted A. Stahl

It is certified that error appears in the above-identified patent and that said Letters Patent is hereby corrected as shown below:

Column 5, claim2,
Line 2, after "coating" insert -- completely covering --;
Line 4, after "coating" delete "completely covering".

Signed and Sealed this

Sixteenth Day of April, 2002

*Attest:*

JAMES E. ROGAN
*Director of the United States Patent and Trademark Office*

*Attesting Officer*